Dec. 14, 1965
B. R. WANLASS
3,223,791
SIX-WAY SEAT ADJUSTER SWITCH WITH SPRING BIASED CENTERING
MEANS AND GYRATIONAL PIVOT STRUCTURE
Filed July 9, 1963
3 Sheets-Sheet 1
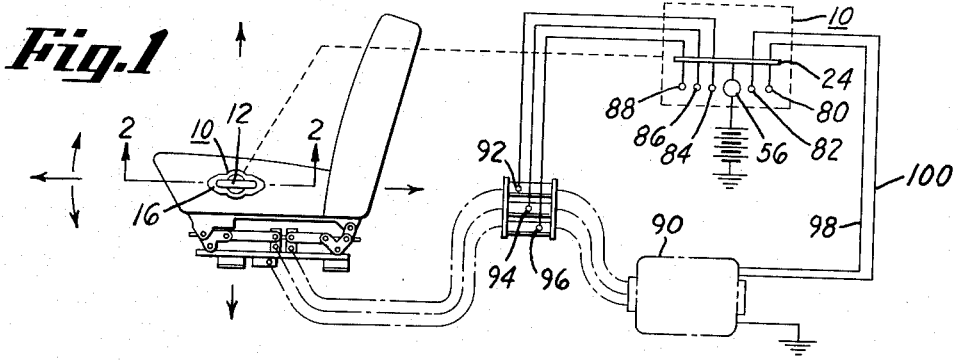
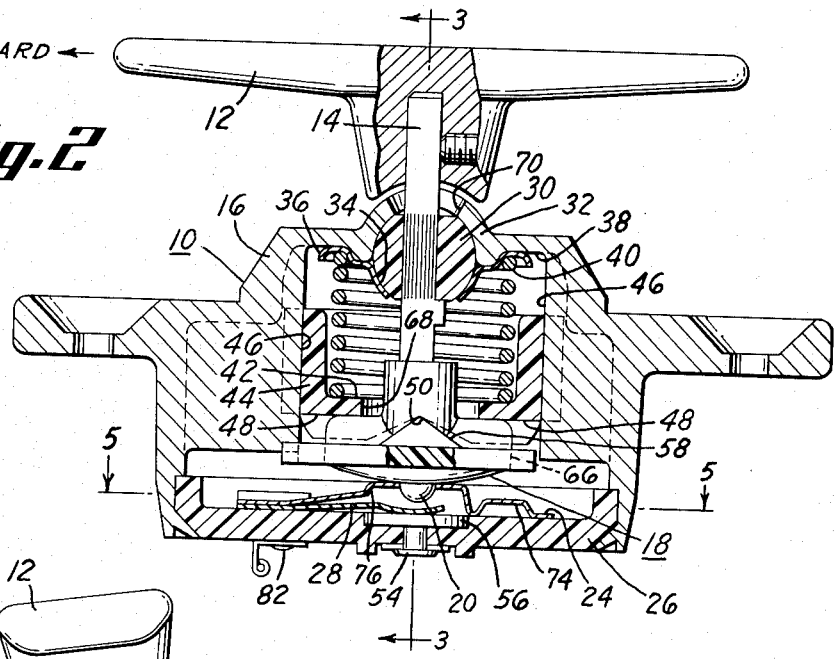
INVENTOR.
BERT R. WANLASS
BY C. R. Meland
ATTORNEY

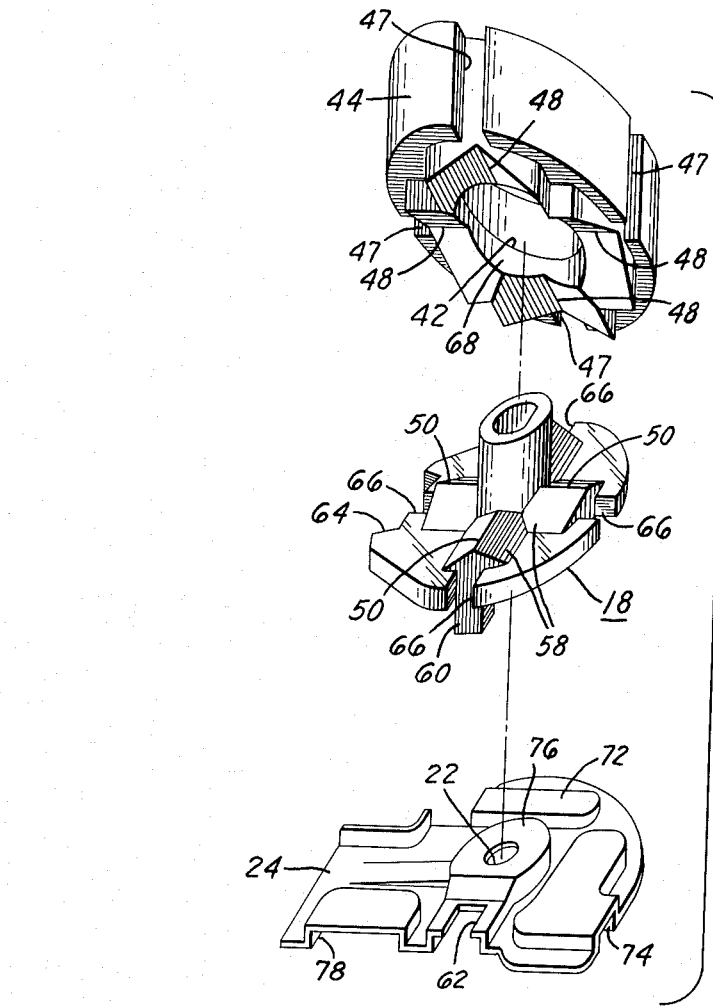
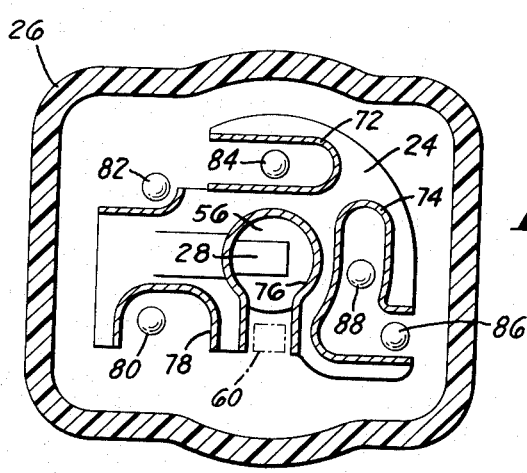
Fig. 4
Fig. 5
INVENTOR.
BERT R. WANLASS
BY C. R. Meland
ATTORNEY Dec. 14, 1965 B. R. WANLASS 3,223,791
SIX-WAY SEAT ADJUSTER SWITCH WITH SPRING BIASED CENTERING
MEANS AND GYRATIONAL PIVOT STRUCTURE
Filed July 9, 1963 3 Sheets-Sheet 3
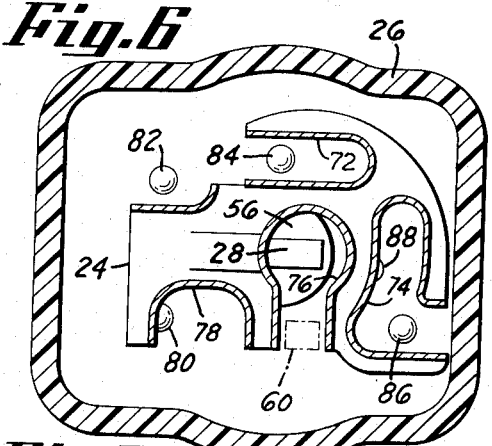
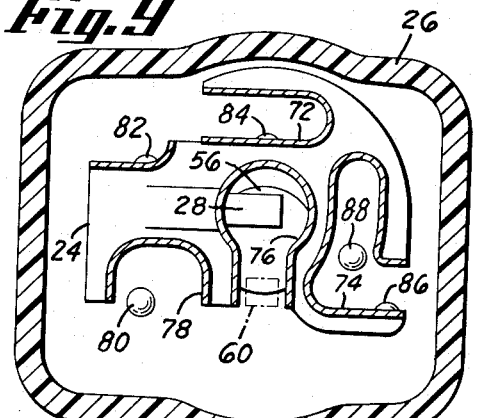
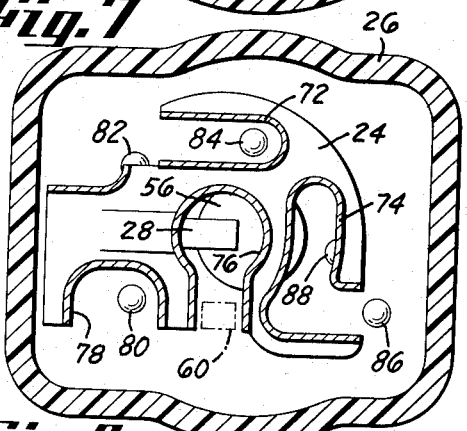
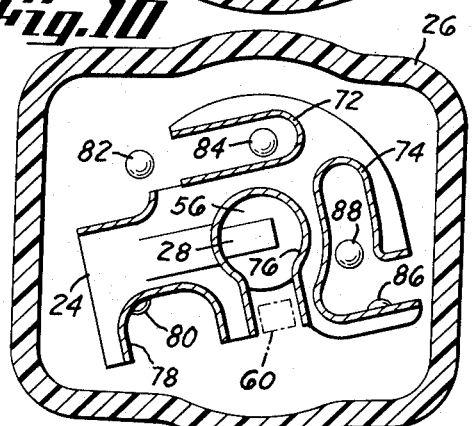
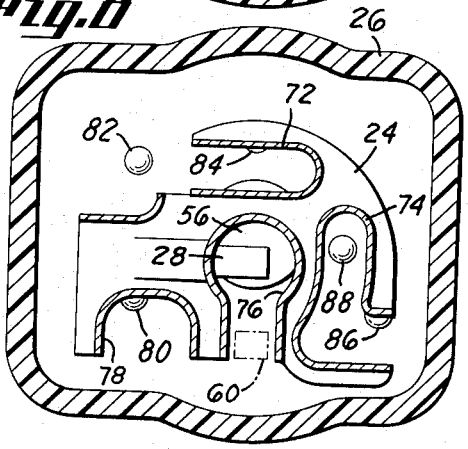
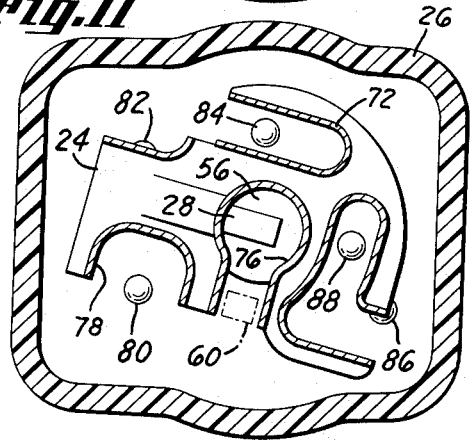
INVENTOR.
BERT R. WANLASS
BY C. R. Meland
ATTORNEY

United States Patent Office 3,223,791
Patented Dec. 14, 1965

3,223,791
SIX-WAY SEAT ADJUSTER SWITCH WITH SPRING BIASED CENTERING MEANS AND GYRATIONAL PIVOT STRUCTURE
Bert R. Wanlass, Warren, Mich., assignor to General Motors Corporation, Detroit, Mich., a corporation of Delaware
Filed July 9, 1963, Ser. No. 293,820
9 Claims. (Cl. 200—6)

This invention relates to electrical switches and more particularly to a type of electrical switch in which a single actuator lever controls a plurality of circuits connected thereto. As an example, it is convenient to be able to adjust the front seat of an automobile in six different directions. While certain devices exist in the prior art for accomplishing this purpose, this invention provides an improved means for bringing about the desired results.

It is an object of the present invention to provide an improved switch that can operate a plurality of circuits using a single actuator.

It is another object of this invention to provide a switch that can center itself after gyrational or rotary movement.

It is a further object of the present invention to provide an electrical switch having relatively few parts that can operate a plurality of circuits in a simple manner and can automatically center itself to a neutral position.

It is yet a further object of this invention to provide a single switch that can control the movement of an automobile seat in six directions by movement of the actuator arm in the direction of the movement desired.

Further objects and advantages of the present invention will be apparent from the following description, reference being had to the accompanying drawings wherein a preferred embodiment of the present invention is clearly shown.

In the drawings:

FIGURE 1 illustrates a six-way seat adjuster switch in its operative location and a series of arrows indicating directions of movement;

FIGURE 2 is a sectional view taken along line 2—2 of FIGURE 1;

FIGURE 3 is a sectional view taken along line 3—3 of FIGURE 2, the actuator being shown in the DOWN position;

FIGURE 4 is an exploded perspective view of the centering guide, the centering button, and the contact plate;

FIGURE 5 is a sectional view taken along line 5—5 of FIGURE 2 illustrating the contact blade superimposed on the contact plate when the actuator lever is in the NEUTRAL position;

FIGURE 6 is a sectional view taken along line 5—5 of FIGURE 2 with the actuator lever in the FORWARD position;

FIGURE 7 is a sectional view taken along line 5—5 of FIGURE 2 with the actuator lever in the AFT position;

FIGURE 8 is a sectional view taken along line 5—5 of FIGURE 2 with the actuator lever in the UP position;

FIGURE 9 is a sectional view taken along line 5—5 of FIGURE 2 with the actuator lever in the DOWN position;

FIGURE 10 is a sectional view taken along line 5—5 of FIGURE 2 with the actuator lever in the ROTATE FRONT position;

FIGURE 11 is a sectional view taken along line 5—5 of FIGURE 2 with the actuator lever in the ROTATE BACK position.

Referring now to FIGURE 2, a six-way seat adjuster switch is generally designated by the numeral 10. An actuator lever 12 has a shaft 14 extending into the switch cover 16 and is press fit into a centering button, generally designated by the numeral 18. The centering button 18 has a rounded lug 20 disposed in an aperture 22 in a contact blade 24. The contact blade 24 is biased between the centering button 18 and a base plate 26 by a contact spring 28. The actuator shaft 14 is in firm engagement with a substantially spherical pivot ball 30. The pivot ball 30 is disposed between a partly spherical portion 32 of the switch cover 16 and pivot bed 34 of a spring retainer 36. The spring retainer 36 is held in firm engagement with a surface 38 of the switch cover 16 by pressure constantly exerted on it by a centering spring 40. Thus, the pivot ball 30 is universally supported by the cooperation of the partly spherical portion 32 of the switch cover 16 and the pivot bed 34 of the spring retainer 36. The centering spring 40 is partly depressed at all times between the surface 38 of the switch cover 16 and a surface 42 of a centering guide 44.

As best seen in FIGURE 4, the centering guide 44 is radially located for vertical movement by a plurality of flanges 46 of the switch body cooperating with a series of peripheral slots 47 in the centering guide 44. Grooves 48 of the centering guide 44 are held in biased engagement with joints 50 of the cam surfaces 58 of the centering button 18.

Referring now to FIGURE 3, a series of contact rivets 52 are embedded in the base plate 26 and are disposed around a hot lead contact 54 to be engaged by a sliding motion of the contact blade 24 during normal operation while the hot lead contact has a disk-shaped head 56 disposed to be constantly engaged by the contact spring 28 during sliding movement of the contact blade 24. The manner of engagement of the contact blade 24 with the contact rivets 52 and the hot lead contact 54 is more clearly illustrated in FIGURE 5.

Referring now to FIGURE 4, the centering button 18 has a series of cam surfaces 58 which cooperate with grooves 48 on the surface of the centering guide 44. The cooperation of the cams 58 and the grooves serves to center the actuator lever 12 after rotational movement. The centering button 18 has a lug 60 which together with the rounded lug 20 serves to prevent random rotational movement of the contact blade 24 on the base plate 26. The relative location of the rounded lug 20 and the lug 60 of the centering button 18 and the contact blade 24 is best seen in FIGURE 3. A rectangular aperture 62 of the contact blade 24 engages the lug 60 while the aperture 22 of the contact blade engages the rounded lug 20.

Referring to FIGURE 4, a peripheral slot 64 prevents the relocation of any of the cams 58 with a different groove 48 of the centering guide 44 during rotational movement of the actuator lever 12 by engaging one of the flanges 46 of the switch body. A series of peripheral slots 66 allows the centering button 18 to clear the flanges 46 of the switch cover 16 during translational movement of the contact blade 24 across the base plate 26.

Referring now to FIGURE 2, an aperture 68 in the centering guide 44 limits the travel of the centering button 18 during the pivotal movement of the centering button. A beveled, circular aperture 70 in the partly spherical portion 32 limits the movement of the actuator shaft 14 in any direction.

Referring now to FIGURE 5, a plurality of contact clearance portions 72, 74, 76 and 78 have been cut away to expose a plurality of contact heads 80, 82, 84, 86 and 88 of the contact rivets 52 in order to more clearly illustrate the operation of the subject invention. An example of a typical seat adjusting mechanism will be used, though it is understood that the utility of this invention is not restricted to use as a control for a multiple-position automobile seat adjustment.

As illustrated in the block diagram of FIGURE 1, the movements of an automobile seat in six directions can be controlled by the use of a single motor 90. The motor 90 is electrically driven and is of the reversible type. In the illustration of this invention, it will be assumed that the contact head 80 is in electrical connection with the motor through a forward and up cycle lead 98 which causes the motor to rotate in one direction. The contact head 82 is in electrical connection with the motor through a down and rear cycle lead 100 which causes the motor to rotate in the opposite direction. The contact head 84 is in electrical connection with a front vertical solenoid 92 which mechanically positions appropriate gearing devices to the motor and thereby controls a flexible drive connection between the motor and a jack screw (not shown) mounted in vertical relationship to the rear of the seat. The contact head 86 is in electrical connection with a rear vertical solenoid 94 which mechanically positions appropriate gearing devices to the motor and thereby controls a flexible drive connection between the motor and a jack screw (not shown) mounted in vertical relationship to the front of the seat. The contact head 88 is in electrical connection with a horizontal solenoid 96 which mechanically positions appropriate gearing devices to the motor and thereby controls a flexible drive connection between the motor and the jack screw (not shown) mounted in horizontal relationship to the seat. Thus, it is seen that a selection of a hot lead and two or more of the contact heads will establish electrical circuits that will first position a gearing device connected through a flexible drive cable to a jack screw and to the motor and, secondly, energize the circuit which will cause the motor to rotate in the desired direction. In the case of the seat being rotated backward or rotated to the front, either the front or rear jack screw drive is energized along with the appropriate motor direction control lead 98 or 100. In the case of moving the seat FORWARD or AFT, the horizontally mounted jack screw will be energized and will cause a corresponding movement in the seat depending on the direction of motor rotation. In the case of moving the seat UP or DOWN, the two vertically positioned jack screws are simultaneously energized to raise or lower the seat depending on the direction of motor rotation.

In operation, when it is desired to move the seat forward, the actuator lever 12 can be moved in a forward direction relative to an operator sitting on the seat illustrated in FIGURE 1.

Referring to FIGURE 2, as the actuator lever 12 is moved in the direction marked FORWARD, the lower end of the actuator shaft 14 pivots in the opposite direction until a portion of the centering button 18 makes contact with the aperture 68 of the centering guide 44. The contact blade 24, being engaged by the rounded lug 20 and the lug 60 of the centering button 18, is caused to move in the opposite direction while the contact heads 80 through 88, of course, remain fixed.

It is best seen in FIGURE 6 that the contact spring 28 will remain in contact with the disk-shaped head 56 of the hot lead contact 54 during this movement. The contact head 80 will come into contact with the edge of the contact clearance portion 78, the contact head 82 will not come into contact with any portion of the contact blade 24, the contact head 84 will not come into contact with any part of the contact blade, the contact head 86 will not come into contact with any part of the contact blade, and the contact head 88 will come into contact with the edge of the contact clearance portion 74. Thus, it is seen that an electrical circuit is established from the battery to the forward and up cycle lead 98 controlling the motor direction and from the battery through the hot lead contact head 56 to the horizontal solenoid 96. The power will cause the horizontal solenoid 96 to position the appropriate gearing mechanism to the motor and, as long as pressure is exerted on the actuator lever 12 in the forward direction, movement of the seat will continue in a forward direction.

The aforementioned cycle can be repeated with analogous results by moving the actuator lever to the rear, up or down, or rotating clockwise or counterclockwise. The unneeded contact heads will always be located in any one of the appropriate contact clearance portions 72, 74, 76 or 78 and the edges of said contact clearance portions will always come into contact with the appropriate contact heads needed to bring about the desired movement. These various actions are illustrated in the sectional views presented in FIGURE 6, FIGURE 7, FIGURE 8, FIGURE 9, FIGURE 10 and FIGURE 11.

The shiftable contact blade 24 is moved in the opposite direction from the direction the actuator lever is moved due to the pivot ball arrangement. An exception to this is in the rotate front motion as illustrated in FIGURE 10 and the rotate back motion as illustrated in FIGURE 11 wherein the contact blade 24 merely turns on the disk-shaped head 56 of the hot lead contact 24.

The shape of the contact blade 24 is controlled by the induced movement and the types of contact heads to be actuated and it is understood that the particular shape of the contact blade 24 illustrated in the described embodiment is peculiar to the use chosen for illustration.

While the embodiment of the present invention as herein disclosed, constitutes a preferred form, it is to be understood that other forms might be adopted.

What is claimed is as follows:

1. An electrical switch having a base carrying contacts comprising, a switch body, an actuator means, a pivoting means pivotally disposed against the switch body carried by said actuator means and cooperating with the switch body, centering means formed as cooperating cam surfaces integral with said actuator means to center said actuator means after a pivotal movement thereof, said centering means including a ball integrally formed as a portion of said actuator means and a socket partially formed on said switch body and partially formed on said centering means, and a contoured contact blade in engagement with said centering means and being positioned relative to said actuator means to be slidably moved along the base of said switch to selectively engage contacts therein.

2. An electrical switch for a plurality of circuits comprising, a body having a base carrying contacts for conductively engaging said plurality of circuits, said body including a bearing portion, an actuator means carrying a spherical pivot extending through one wall of said body and cooperating with said bearing portion, adapated for pivotal movement and centering means including cooperating cam surfaces formed integrally with said actuator means to center said actuator means after a pivotal movement, and a contoured contact blade operatively carried by said centering means and biased towards said base, said contoured contact blade being responsive to the movement of said actuator means for the selective conductive engagement of said contacts to the plurality of circuits.

3. An electrical switch for electrical systems controlling directional movements of apparatus comprising, a body having a base plate and a bearing portion, said base plate having contacts embedded therein, an actuator means having a substantially spherical portion extending into said body through one wall thereof cooperating with said bearing portion, centering means formed integrally with said actuator means to bias said actuator means towards a centered position and having a plurality of lugs, and a contoured conductive blade being engaged by said plurality of lugs and being shiftable into at least six positions by said actuator means to slidably engage said base plate contacts, said contacts being disposed to actuate circuits to electrical devices, said electrical devices controlling movement of apparatus in a direction corresponding to the direction in which the actuator means is moved.

4. An electrical switching mechanism having an actuator means for the directional control of apparatus corresponding to the direction of actuator movement comprising, a body including a base plate with contacts passing therethrough, an actuator pivotally supported on said body, centering means including members having opposed cam surfaces, said centering means including a ball integrally formed as a portion of the actuator and a socket partially formed on said switch body and partially formed on a complementary surface of said centering means, and a resilient contact blade shiftable by said actuator and having contoured portions adapted for sliding movement along said base plate, said actuator being operatively carrying said contact blade whereby the contact blade will selectively engage or by-pass the base plate carried contacts to energize circuits to apparatus and thereby bring about movement in said apparatus in a direction corresponding to the actuator movement, said opposed cam surfaces being biased by said resilient contact blade to constantly urge said actuator to a centered position.

5. An electrical switch comprising, a switch body having a base, an actuator lever disposed through an aperture in said body being held in biased engagement with a portion of said switch body and pivotally mounted thereon, biasing means carried in said switch body circumferentially with respect to said actuator lever for maintaining said lever biased against any movement thereof, centering means integrally formed as a portion of the actuator lever and having cam portions and a plurality of lugs firmly engaging one portion of said actuator lever, said centering means including a ball integrally formed as a portion of the actuator lever and a socket partially formed on said switch body and partially formed on said bias means, and a resilient conductive contact blade shiftable by said actuator lever and held in biased engagement with said plurality of lugs and said switch base, said conductive contact blade having irregularly shaped contoured surfaces, said base having contacts embedded therein and disposed to cooperate with said contoured surfaces of said conductive contact blade in response to movement of the actuator lever to selectively energize various circuits through leads connected to said contacts.

6. An electrical switch for selectively energizing a plurality of electrical circuits, said switch comprising, a switch body, a base plate carrying contacts having electrical circuits connected thereto, a conductive plate shiftable on the base plate and cooperating with said contacts, and centering means including an actuator lever having a substantially spherical portion cooperating with a substantially hemispherical portion of the switch body and a substantially hemispherical portion of a spring retaining plate for universal location, and a spring means urging said hemispherical spring retainer towards said switch body portion and towards a plurality of members having opposed cam surfaces, said actuator lever being held in biased, centered juxtaposition against a rocking motion by the coaction of said spring means and said hemispherical portion and being held in biased centered juxtaposition against a rotary motion by the coaction of the opposed cam surfaces and said spring means.

7. A device for maintaining a lever in biased centered juxtaposition comprising, a lever having a substantially spherical portion cooperating with a substantially hemispherical portion of a switch body and a substantially hemispherical portion of a spring retaining plate for universal location, contact means carried in slidable relationship with respect to the switch body and including members having opposed cam surfaces, at least one of which is responsive to movement of the lever, and a spring means urging said hemispherical spring retainer towards said switch body portion and away from said plurality of members having opposed cam surfaces, said actuator lever being held in biased centered jnuxtaposition against a rocking motion by the coaction of said spring means and said hemispherical portion and being held in biased centered juxtaposition against a rotary motion by the coaction of the opposed cam surfaces and said spring means.

8. An electrical switch comprising: a switch body having a base portion and a hemispherical pocket formed in one portion thereof, fixed contacts carried by said base portion and conductively engaging electrical circuits external to said switch body; an actuator lever having an integral ball portion disposed for pivotal movement in the hemispherical pocket of said switch body; centering means including a slide element having cam surfaces thereon, a spring, and a spring retainer having a hemispherical pocket formed therein biased toward the hemispherical pocket of said switch body by said spring to yieldably retain the ball portion of said actuator against gyrational movement; and contoured contact means slidably disposed for sliding movement on the base portion of the switch body, said contoured contact means engaging said actuator lever and responsive thereto for sliding movement during pivotal movements of said actuator lever; said actuator lever including an integrally formed series of cam surfaces arranged to cooperate with the cam surfaces of said slide element to center said actuator lever after a pivoting movement, said contoured contact means having portions arranged to completed circuits by bridging predetermined fixed contacts during a pivoting movement of said actuator lever thereby performing a switching action.

9. A centering device for an electric switch, said device comprising: a switch actuator adapted for gyrational movement in a switch body; ball and socket means, at least one portion carried by the switch body and another portion carried by said switch actuator, for controlling relative movement between said switch actuator and the body; cam means for centering said switch actuator after rotational movement thereof, said cam means including complementary formed portions carried by said switch actuator; and biasing means carried between said cam means and said ball and socket means circumferentially with respect to said switch actuator for urging said switch actuator to a centered position after movement thereof.

References Cited by the Examiner
UNITED STATES PATENTS

| | | | |
|---|---|---|---|
| 2,077,578 | 4/1937 | Meracher | 74—473 |
| 2,136,697 | 11/1938 | Lapsley | 74—473 |
| 2,399,462 | 4/1946 | Bryant | 200—6 |
| 2,589,025 | 3/1952 | Phelps et al. | 200—6 |
| 2,751,468 | 6/1956 | Brown et al. | 200—16 |
| 2,849,548 | 8/1958 | Young | 200—6 |
| 2,849,549 | 8/1958 | Elliott | 200—6 |
| 2,857,485 | 10/1958 | Brooks | 200—6 |
| 2,880,815 | 4/1959 | Apfelbaum | 296—65 |
| 2,921,621 | 1/1960 | Williams et al. | 296—65 |
| 2,941,048 | 6/1960 | Lynbrook et al. | 200—6 |
| 2,978,549 | 4/1961 | Kruger | 200—16 |

KATHLEEN H. CLAFFY, *Primary Examiner.*

BERNARD A. GILHEANY, *Examiner.*